United States Patent [19]

Mitchell

[11] 3,997,251
[45] Dec. 14, 1976

[54] MAGAZINE CAMERA

[76] Inventor: George A. Mitchell, 687 Prospect Crescent, Pasadena, Calif. 91103

[22] Filed: Aug. 29, 1975

[21] Appl. No.: 608,827

[52] U.S. Cl. .............................. 352/72; 352/194; 226/55
[51] Int. Cl.² ........................................ G03B 23/02
[58] Field of Search ............ 352/191, 194, 196, 72; 226/55, 56, 57, 58

[56] References Cited

UNITED STATES PATENTS

| | | | |
|---|---|---|---|
| 1,512,477 | 10/1924 | Nelson | 352/72 |
| 1,994,586 | 3/1935 | Mihalyi | 352/72 |
| 3,281,199 | 10/1966 | Kingston | 352/72 |
| 3,428,395 | 2/1969 | Mitchell | 352/194 |
| 3,587,960 | 6/1971 | Gerb | 352/194 |

FOREIGN PATENTS OR APPLICATIONS 344,512  3/1931  United Kingdom ............... 352/196

*Primary Examiner*—Monroe H. Hayes

[57] ABSTRACT

The disclosed structure facilitates threading the film by eliminating both the intermittent movement and the film metering sprocket from the film chamber. Noise is reduced by driving the intermittent movement with a single cam, and faster faster pulldown is obtaind by combining the single cam movement with a re-entrant claw, which also facilitates positioning the movement in a separate sealed compartment. Drive mechanism for a film sprocket in the throat of the magazine includes improved positive clutch structure. Registration pins are driven by an improved linkage which facilitates film threading.

12 Claims, 6 Drawing Figures

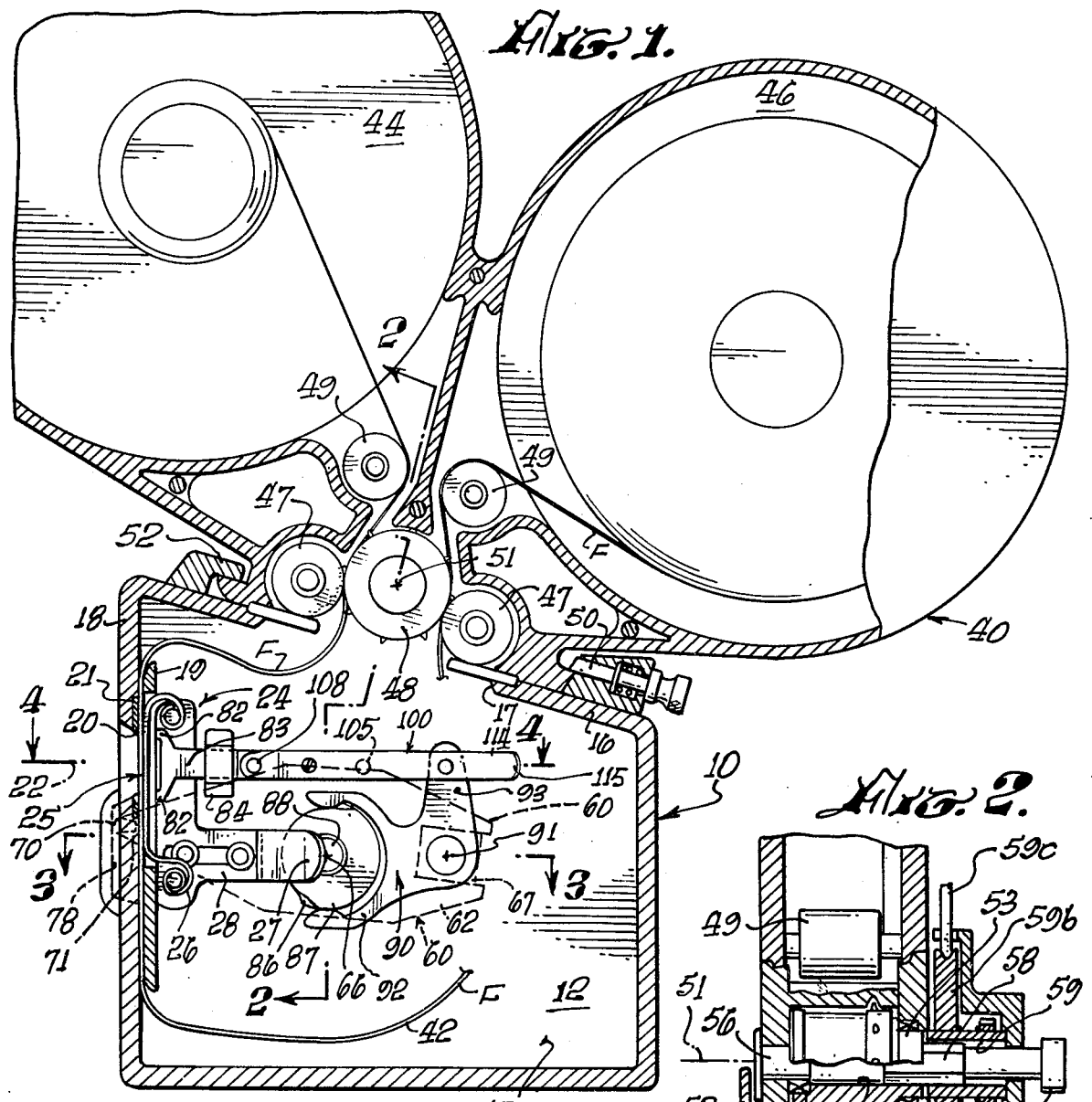
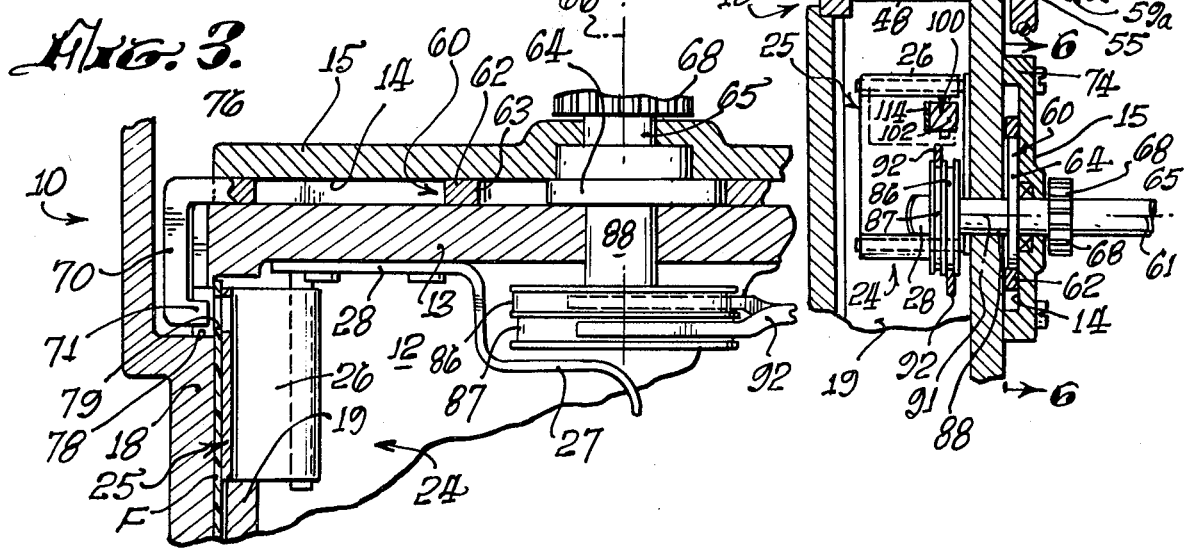

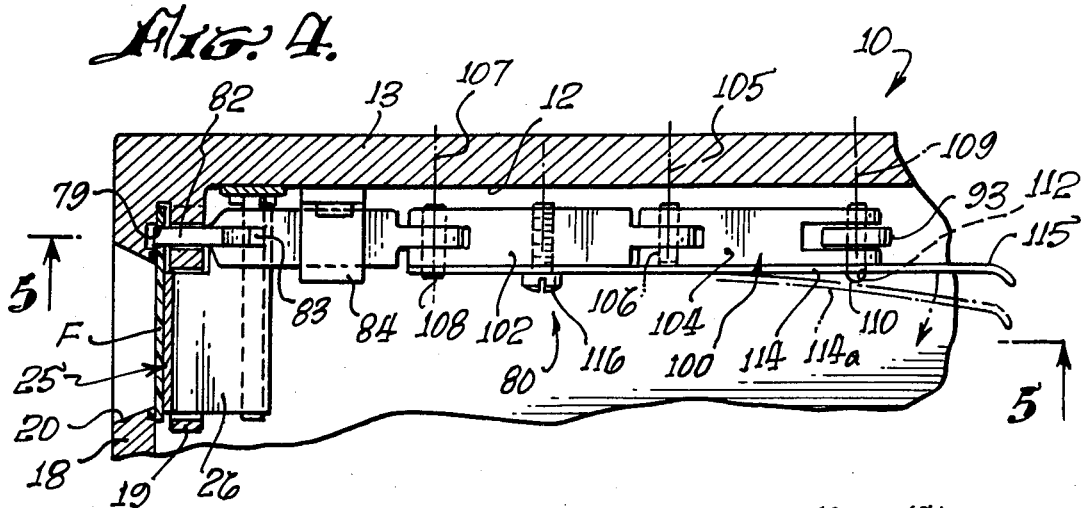
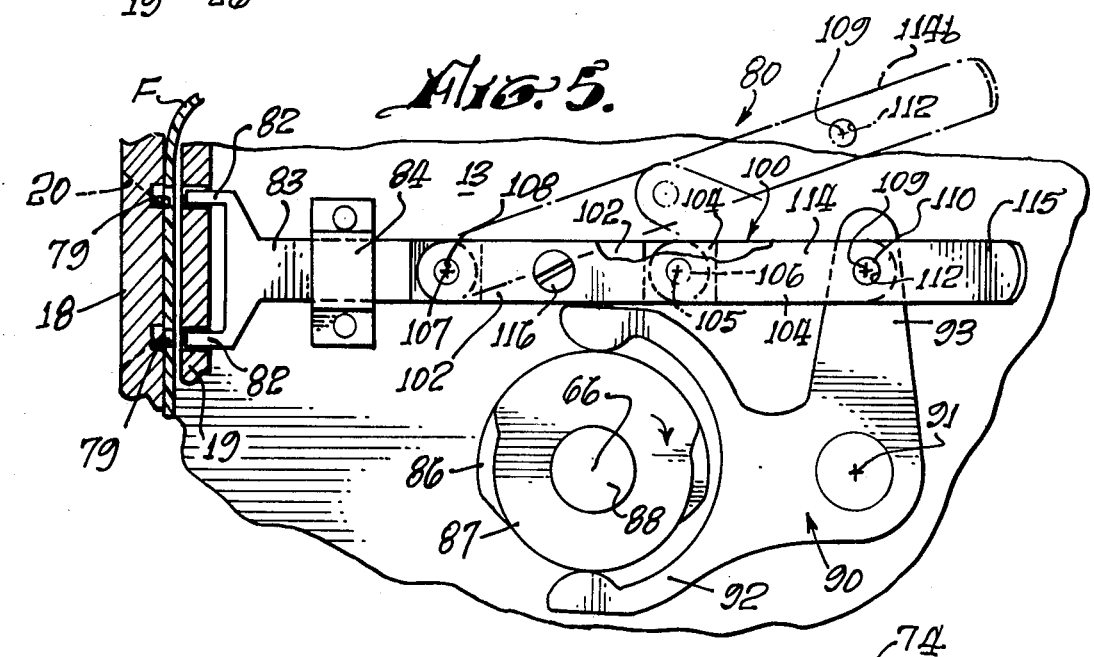
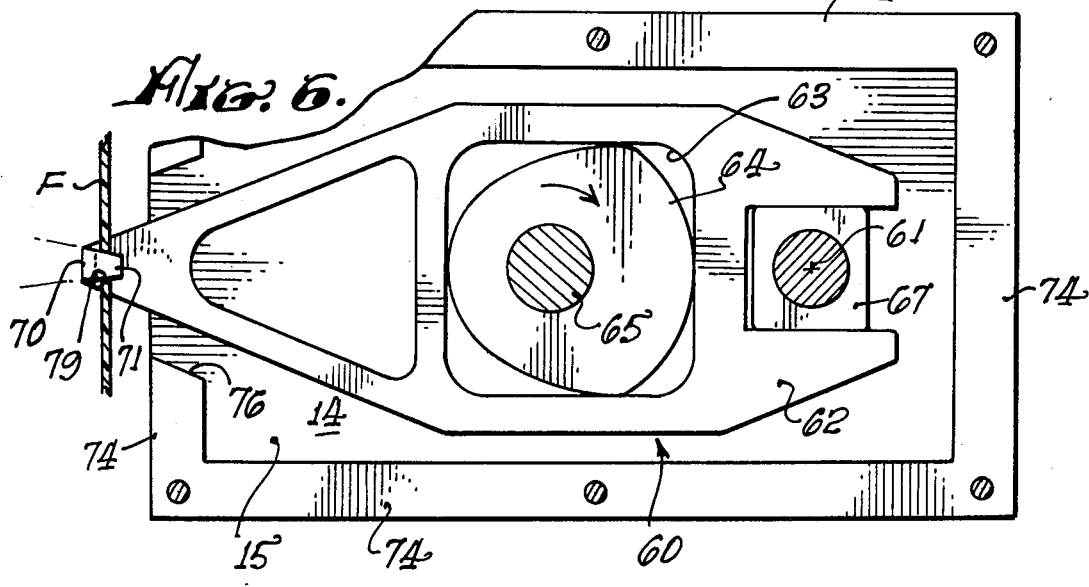

MAGAZINE CAMERA

This invention has to do with motion picture cameras, and is especially, though not exclusively, useful in cameras having cam-driven intermittent movements and interchangeable film magazines.

The invention provides a number of novel features which are most effective when used in combination, but each of which is also capable of providing distinct advantages when used alone or in various subcombinations.

Among the chief objects of the invention are simpler and more rapid threading of the film in the film gate, including improved access to the register pin mechanism during threading, elimination of the usual buckle trip which protects against film pile-up in case of failure of the take-up reel drive, the provision of larger shutter openings in combination with intermittent movements employing a single cam to drive both the pull down and meshing actions of the claw arm, and more effective control of the noise produced by the intermittent movement.

One aspect of the invention permits the intermittent movement to be enclosed in a compartment of the housing separate from the film chamber. That mechanism compartment is preferably relatively small in size, with side walls which provide full guidance on both faces of the claw arm. Removal of the intermittent movement to a separate compartment leaves the film chamber unencumbered, facilitating threading of the film. Moreover, the separate mechanism compartment may be virtually completely sealed for retention of noise, only a narrow slot being required through which the pull down arm extends to engage the film.

A further aspect of the invention provides in combination a single cam of high speed configuration for driving both the meshing and pulldown actions of the claw arm, and a claw which enters the film perforations from the front face of the film. The single cam permits the claw arm to be lighter than when dual cams are used, raising the average frequency of the noise that is produced and facilitating its control. The re-entrant claw simplifies effective sealing of a separate compartment enclosing the intermittent movement. Moreover, use of a re-entrant claw in combination with a single cam drive permits the cam to rotate in the direction which provides maximum film exposure time.

A still further aspect of the invention permits the usual positively driven feed and take-up sprocket mechanism to be eliminated from the film chamber. That mechanism is placed instead in the throat of the film magazine, and is driven from the camera via a suitable positive clutch. At the time the film is loaded in the magazine a film loop of suitable size is formed. When such a magazine is mounted on the camera it is only necessary to insert that loop into the film chamber and place it in the film gate. The resulting ease of threading is especially marked when the described sprocket arrangement is used in combination with an intermittent housed in a separate compartment, as described above.

During camera operation with the improved magazine just described, film from the feed compartment of the magazine is fed at proper rate by the sprocket in the magazine throat directly to the film gate. After passing through the gate the film is automatically and positively returned to the take-up compartment of the magazine. In previous practice, with the take-up sprocket in the film chamber, if the regular drive of the take-up reel should become disabled, as by failure of the take-up belt, for example, exposed film tends to pile up in the film compartment, which can cause serious damage and loss of the film. It has therefore been necessary to place a buckle trip mechanism in the film chamber to sense such pile-up and turn off the motor. With the sprocket in the magazine the usual buckle trip is not needed. Should the belt fail, all the exposed film will still be delivered to the take-up side of the magazine and may be usable.

Removal of the intermittent mechanism and/or the sprocket mechanism from the film chamber simplifies threading of the film in a further respect in cameras employing registration pins, since the pin actuating mechanism is then conveniently accessible for retracting the pins. A particularly effective coupling mechanism for that purpose will be described.

The substantially clear and unobstructed condition of the film chamber has the further advantage of providing convenient installation for mounting a conventional sound recording head for producing a magnetic or other sound track on the film.

A further aspect of the invention provides improved clutch structure for positively coupling a sprocket in the magazine throat to a drive shaft on the camera without encumbering the magazine by excessive projections and without exposing any gear mechanism to dirt or damage.

A full understanding of the invention, and of its further objects and advantages, will be had from the following description of an illustrative manner of carrying it out. The particulars of that description, and of the accompanying drawings which form a part of it, are intended only as illustration and not as a limitation upon the scope of the invention, which is defined in the appended claims.

In the drawings:

FIG. 1 is a somewhat schematic vertical section taken through the optical axis and representing an illustrative embodiment of the invention;

FIG. 2 is a fragmentary section on line 2—2 of FIG. 1;

FIG. 3 is a fragmentary section at enlarged scale on line 3—3 of FIG. 1;

FIG. 4 is a fragmentary section at enlarged scale on line 4—4 of FIG. 1;

FIG. 5 is a section generally on line 5—5 of FIG. 4; and

FIG. 6 is a fragmentary section at enlarged scale on line 6—6 of FIG. 2.

FIGS. 3 and 4 show the mechanism during a film exposure, FIGS. 5 and 6 during film pull-down.

In the illustrative embodiment show in the drawings the main camera housing is represented in fragmentary form at 10, defining the film chamber 12 and the mechanism compartment 14 on opposite sides of the vertical sidewall 13. The front wall 18 of film chamber 12 carries the aperture plate 21 with the film aperture 20 on the optical axis 22. The film F is guided past that aperture between the chamber front wall 18 and the rigid guide flange 19, and is positioned at the aperture by film gate mechanism which inclues the pressure plate 25. That plate is formed to contact the back face of the film through an opening in guide flange 19. Pressure plate 25 is mounted on the support 28 by spring mechanism indicated at 26, by which it is lightly urged toward aperture plate 21. Support 28 is slidably mounted on sidewall 13 and may be moved back by the handle 27 to open the gate for inserting and removing the film.

The film is supplied from the film magazine 40, which is releasably mounted on the camera housing 10 in conventional manner by the flange 52 and the manually releasable latch 50. The film is metered to chamber 12 from the supply reel 44 of the film magazine by the positively driven sprocket 48. The film enters film chamber 12 through the opening 17 in the top chamber wall 16, forming the closed loop 42. Film is withdrawn from loop 42 by the same sprocket to the take-up reel 46, which is yieldingly driven in any suitable manner, as by a conventional belt drive or torque motor, see description below. The film is retained on sprocket 48 by the two freely rotating resilient rollers 47, and is guided to and from the reels by the rollers 49..

The intermittent movement 60 by which the film is advanced past aperture 20 is located in mechanism compartment 14, which lies on the opposite side of sidewall 13 from film chamber 12. Compartment 14 is typically formed by sidewall 13, the closely spaced parallel wall 15, and the relatively narrow walls 74 which extend between walls 13 and 15 and are typically formed as integral flanges on the latter. Intermittent movement 60 comprises the flat claw arm 62, which carries the film engaging claw 70 at its forward end and is slidingly pivoted at 67 at its rearward end on the fixed pivot axis 61. Claw arm 62 is guided over substantially its entire area by the spaced opposing walls 13 and 15, and can thus be made unusually thin and correspondingly light without loss of effective rigidity.

The forward end of claw arm 62 projects from mechanism compartment 14 through the vertical slot 76 in wall 74. Film engaging claw 70 extends laterally from that projecting portion of the claw arm at a point forward of the plane of film F in gate 24. The working tip 71 of the claw bends back, forming a reversed or re-entrant claw. That claw 70 is received by the vertical clearance slot 78 in wall 18 and enters film perforations 79 from the front face of the film.

Claw arm 60 is driven in its radial and rotary oscillatory movements with respect to pivot axis 61 by the single cam 64. That cam is mounted on the cam shaft 65, which is journaled on wall 15 on the cam axis 66, and is driven by gearing represented schematically at 68. Cam 64 works in a square aperture 63 in the claw arm, engaging suitable follower surfaces formed on the respective sides of that square. One pair of opposite followers is generally vertical and controls the radial claw arm movement and hence the meshing action of claw 70. The other pair of opposite followers is generally horizontal and controls the rotary claw arm movement and hence the film advancing or pulldown action of the claw.

Cam 64 is preferably of the known type with two opposite circular holding surfaces of different radius, each extending through an angle exceeding 90° and shown illustratively as 120°. The holding surfaces are separated by two opposite driving surfaces which are circularly curved about the respective end points of the holding surface of larger radius, and which form extensions of the holding surface of smaller radius. Such a cam drives claw 70 in a nearly rectangular path with sharp and essentially square corners. The meshing segments of the path are straight lines which are radial with respect to pivot axis 61 and have a length directly equal to the throw of cam 64. The pulldown segments of the claw path are slightly curved, with centers of curvature close to pivot axis 61 and with lengths corresponding to the cam throw increased by the mechanical advantage of the claw arm, which is essentially the ratio of the distances of pivot axis 61 from claw 70 and from cam shaft 65. The slight curvature of the pulldown path of the claw may be accurately matched by curvature of the film path. As illustrated, however, that curvature is neglected, the film following a straight path generally tangent to the actual excursion of the claw. Improved definition of each film position is obtained by slightly tapering the tip of the claw, as indicated in FIG. 6 with some exaggeration for clarity of illustration.

The described re-entrant claw configuration has the highly beneficial result, when combined with a single cam intermittent drive of the general type described, that the pulldown stroke of the claw occurs when the claw arm is at the rearward extreme of its meshing movement. In that meshing position the pulldown action of the cam causes the claw arm to swing about pivot axis 61 in the direction opposite to the cam rotation about cam axis 66. For a given rate of cam rotation, the effective angular movement of the cam relative to the claw arm is then the sum of the cam rotation and the swinging movement of the claw arm. The pulldown action is therefore completed within a cam rotation angle which is less than the angular extent of its pulldown surfaces by the total angular excursion of the claw arm. The film is thus advanced more rapidly than is possible when the cam rotates in the same direction as the rotary claw arm movement during pulldown, since the cam rotation angle during pulldown is then increased by the angular excursion of the claw arm. The more rapid pulldown provided by the present configuration permits the film to remain at rest for a longer time during each cycle. Hence the angular shutter opening can be increased, lengthening the film exposure time.

As a typical example, if each of the cam driving surfaces extends through 60° about the cam axis, as in the present illustrative cam 64, and if the total claw arm angular excursion has the moderate value of 12°, the pulldown stroke in a movement using the present re-entrant claw is completed within only 48° of cam rotation, in contrast to 72° for a conventional claw driven by the same single cam. Thus, the re-entrant claw reduces the pull-down time by one third, a highly significant gain.

The prior art has partially appreciated the above described problem of claw arm rotation, but only to the extent of obtaining the more rapid pulldown under the limited condition of using separate cams for driving the meshing and pulldown components of the claw arm movement. By mounting those two cams in opposite phase relation on a common shaft it was then possible to obtain pulldown action by a conventional claw with shaft rotation opposite to the angular claw arm movement. In movements using only a single cam, however, the slower pulldown action has been accepted as unavoidable. The present invention makes the rapid pulldown available also in single cam movements by employing a re-entrant claw to invert the effective relative phase of the two components of claw arm movement. Not only is the single cam inherently simpler, but it permits the claw arm to be made appreciably lighter in mass, greatly facilitating control of the generated noise.

An important advantage of the described location of intermittent movement 60 in compartment 14 separate from film compartment 12 is the resulting relative freedom of the film compartment, greatly facilitating threading of the film. That freedom is further increased by placement of sprocket 48 in the throat of the magazine. Both those features are especially helpful in cameras which include registration pins for positively defining the film position in the gate during each exposure. Whatever particular mechanism is used for driving the registration pins and for manually releasing those pins from the film in order to permit insertion and removal of the film, the additional space made available by the invention permits the manual control to be made more conveniently accessible than in conventional cameras.

A further aspect of the present invention comprises improved linkage mechanism for driving the pilot pins, with particularly convenient means for modifying the linkage to withdraw the pins from the film during threading. That linkage mechanism includes two links pivoted at one end on a common pivot axis and with their other ends pivotally coupled respectively to the pilot pins and to the cam mechanism. During normal operation the two links are latched with respect to each other so that the three pivot axes lie in a common plane. Upon release of the latch the two links can swing relative to each other about their common pivot axis, thereby shortening the distance between their outer ends and withdrawing the pilot pins from their normal position to release the film. A particular advantage of the described structure is that in normal operating condition the links are mutually aligned and are therefore able to transmit a longitudinal driving force to the pilot pins without producing any torque which must be resisted by the latch. Hence that latch mechanism can be made extremely light in mass and simple in operation. A linkage of the described type can be incorporated in a wide variety of different mechanisms for driving pilot pins in a camera. The drive mechanism to be described has the particular advantage that it can readily be combined with a linkage of sufficient size and of such location that it is convenient to construct and to operate.

In the present illustrative registration mechanism 80 the two registration or pilot pins 82 are mounted on the respective arms of the yoke 83. The yoke shank is guided for sliding movement by the support 84, fixedly mounted on sidewall 13. Pins 82 ae typically guided in bushings set in flange 19 at suitable positions spaced longitudinally of the film F, and are formed to enter respective film perforations and accurately define the film position during each film exposure. The sliding movement of yoke 83 is positively driven by the two cams 86 and 87, which are fixedly mounted on an extension 88 of shaft 65 of the intermittent movement, which projects through sidewall 13. Those cams drive the bell crank 90, which is pivoted on sidewall 13 on the fixed pivot axis 91 and comprises the generally horizontal yoke 92 and the generally vertical arm 93. Arm 93 is coupled by the linkage mechanism 100, to be more fully described, to the rearward end of pin-carrying yoke 83. Cams 86 and 87 typically engage the respective arms of yoke 92, and are of complementary form designed in known manner to define positively the angular position of the yoke and to cause it to shift rapidly between film registering and film releasing positions in suitable time relation to the film advancing action of intermittent movement 60.

Linkage mechanism 100 comprises the two links 102 and 104 which are mutually pivoted at their adjacent ends by the pivot pin 106 on the common pivot axis 105. The forward end of link 102 is pivotally coupled by the pin 108 on the pivot axis 107 to the rearward end of pin-carrying yoke 83. The rearward end of link 104 is pivoted by the pin 110 on the pivot axis 109 on the upper end of arm 93 of bell crank 90. The pivot axes 105, 107 and 109 are all mutually parallel, and the couplings preferably comprise carefully formed parts which permit relatively free pivotal movement in a plane perpendicular to those axes while preventing movement out of that plane. The two links 102 and 104 are normally restricted against relative pivotal movement, being releasably locked in a definite mutual relation, preferably such that the three pivot axes 105, 107 and 109 lie in a common plane, as shown in solid lines in the drawings. The present illustrative latch mechanism for holding the links in operating relation comprises a strut mounted in fixed relation to one link and releasably connected to the other. In preferred form, the latch comprises a light and somewhat resilient strip 114 mounted on the forward link 102 on the link face opposite to sidewall 13. Strip 114 is typically defined relative to the link by suitably spaced apertures which fit over the projecting ends of pivot pins 106 and 108, and is retained in that position in any suitable manner, as by the screw 116. A further aperture 112 in strip 114 normally fits over the projecting end of pivot pin 110, positively defining the angular relation of the two links. Strip 114 carries a handle 115 at its rearward end, typically formed as an extension of the strip beyond pivot pin 110.

When a film is to be inserted in, or removed from, the film gate, the intermittent movement is first adjusted in the usual way to a position in which the film advancing claw is free of the film. Handle 115 of the registration pin linkage is then manually shifted away from sidewall 13, resiliently deflecting the strip, as indicated in dashed lines at 114a in FIG. 4. As soon as the strip is thus feed from pivot pin 110, the same handle is used to swing the strip in a counterclockwise direction about pivot axis 107, carrying link 102 with it to a position such as that shown in dashed lines at 114b in FIG. 5. Link 104 is thereby caused to swing in the opposite direction. The resulting angular relation between the two links draws pivot axes 107 and 109 closer together, withdrawing yoke 83 and freeing the film from registration pins 82. To return linkage 100 to normal operating condition, handle 115 is simply swung back into alignment with link 104. Upon gradual release of the handle, strip 114 springs back into contact with the end of pin 110, and as soon as alignment is complete the pin enters the hole 112, closing the latch.

Film metering sprocket 48 is journaled on the housing of magazine 40 for free rotation about the sprocket axis 51, and is positively driven in suitable speed relation to intermittent mechanism 60 via improved positive clutch mechanism. In the illustrative structure shown, the sprocket has an axial through bore which is counterbored at the left end, as seen in FIG. 2, to receive the bearing 54 mounted on the stub shaft 56. The bearing 55 at the other end of the sprocket is mounted on the axial flange 53. The sprocket bore is formed with a non-circular cross section, preferably having multiple symmetry such as hexagonal or the like, as indicated at 57. A clutch member 58 with complementary symmetry is mounted on the camera body for axial and rotational movement with respect to an axis which is aligned with sprocket axis 51 of a mounted magazine.

As shown, the member 58 is axially slidable in splined relation within the sleeve 59 which is journaled on the camera and is coupled to the intermittent movement by gearing indicated at 59a. Sleeve 59 also carries the pulley 59b which drives takeup reel 46 via the flexible belt 59c and a pulley, not shown, on the reel shaft. The axial position of clutch member 58 is shiftable, as by the integrally formed knob 58a, between the sprocket engaging position shown in FIG. 2 with its hexagonal section partially within sleeve 59 and partially within the sprocket, and a sprocket releasing position entirely within sleeve 59. Conventional detent mechanism, not explicitly shown, may be provided for yieldably retaining member 58 in the selected position.

Many modifications may be made in the particular structures that have been described and illustrated without departing from the true essence of the present invention.

I claim:

1. In a motion picture camera, the combination of structure forming a film chamber and a mechanism chamber separated by a side wall and each having a front wall,
a film aperture in the front wall of the film chamber with gate means for guiding a film past the film aperture,
intermittent mechanism including a claw arm having a main body mounted in the mechanism chamber and a forward portion projecting forwardly through a fitting slot in the front wall of the mechanism chamber,
claw means carried by said forward portion of the claw arm and extending rearwardly through a clearance aperture in the front wall of the film chamber for intermittently entering a film sprocket hole from the front face of the film to advance the film in said gate means,
a shaft journaled on a shaft axis generally perpendicular to said side wall,
first cam means carried by the shaft in the mechanism chamber for engaging and driving the claw arm,
registration means mounted in the film chamber for movement between film registering and film releasing positons,
second cam means carried by the shaft in the film chamber for engaging and driving the registration means in timed relation to the intermittent mechanism,
said registration means including means in the film chamber for manually overriding said second cam means to release the film from the registration means for threading,
the film chamber having a door for providing manual access to the film gate and the overriding means,
the mechanism chamber enclosing said first cam means and said body of the claw arm in substantially sealed relation in all positions of the door.

2. Combination according to claim 1 wherein said claw arm is substantially flat and is mounted for rotary and oscillatory movements in its plane, said mechanism compartment including -
guide surfaces parallel to said plane and slidingly engaging the claw arm on both sides and over substantially its entire length for guiding its said movements.

3. Combination according to claim 1, said film chamber having an apertured top wall, said combination including
mounting structure for mounting a film magazine on the camera adjacent said top wall,
a film magazine including supply and take-up reels and sprocket means drivable to feed film positively to and from a free film loop of constant size adapted to extend freely from a mounted magazine through said aperture in the top wall into said film chamber and through said gate means on the front chamber wall,
and releasable drive means engageable between the camera and a mounted magazine for positively driving said sprocket means from the camera.

4. In a motion picture camera, the combination of structure forming a film chamber having a front wall which contains a film aperture, and having a side wall,
film gate means for guiding a film in the chamber past the aperture,
intermittent mechanism adjacent the side wall outside the film chamber,
claw means driven by the intermittent mechanism for intermittently entering a film sprocket hole from the front face of the film to advance the film,
and registration means mounted in said film chamber for movement between film registering and film releasing positions,
a shaft journaled on a shaft axis generally perpendicular to said side wall with respective shaft portions in said film chamber and in said mechanism chamber,
first cam means mounted on the shaft in said mechanism chamber for driving said intermittent mechanism, and
second cam means mounted on the shaft in said film chamber for driving the registration means,
said registration means comprising
registration pin means,
first and second links pivotally coupled together at adjacent ends on a transverse pivot axis parallel to said shaft axis,
means pivotally coupling said links at their respective other ends to the registration pin means and to said second cam means,
and manually releasable latch means for locking said links in mutually parallel relation.

5. Combination according to claim 4, said registration means including
bell crank means pivotally mounted on said side wall on a pivot axis parallel to said shaft axis and spaced rearwardly therefrom, said bell crank means including a driving arm extending forwardly from the pivot axis and engaging said second cam means and a driven arm extending transversely of the driving arm, and
means coupling the driven arm and the registration pin means.

6. In a motion picture camera which includes gate means for guiding a motion picture film along a film path past an exposure aperture, intermittent mechanism for intermittently engaging a film to advance the same along the path, registration means for selectively engaging a film in the path to anchor the film, and means for driving the registration means in timed relation to the intermittent mechanism; means for manually overriding the driving means to cause the registration means to release the film for threading, comprising normally rigid link means normally forming a positive driving connection between the registration means and the driving means and comprising two links pivotally coupled together at adjacent ends on a transverse pivot axis and coupled at their respective other ends to the registration means and to the driving means, latch means for normally preventing relative pivotal movement of the links, and manually operable means for releasing the latch means and for producing relative pivotal movement of the links with respect to said pivot axis to draw said other link ends closer together and thereby release the film.

7. Overriding means according to claim 6 wherein said links are coupled to the driving means and to the registration means by respective pivot bearings having bearing axes parallel to each other and to said transverse pivot axis.

8. Overriding means according to claim 7, said latch means comprising structure normally locking said links in mutually parallel relation with said pivot axis and said bearing axes in a common plane.

9. overriding means according to claim 7, said latch means comprising an elongated latch member mounted in fixed relation to said pivot axis and to one of said bearing axes, and means for releasably coupling the latch member with respect to the other said bearing axis.

10. Overriding means according to claim 6, said latch means comprising an elongated latch member mounted at one end in substantially fixed relation to one of said links and including a resiliently flexible portion extending generally parallel to the other link, releasably engagable formations mounted respectively on said other link and on the extending portion of the latch member, the latch member having a normal position in which said formations are mutually engaged and a resiliently deflected position in which said formations are mutually spaced.

11. Overriding means according to claim 10, said manually operable means including handle structure carried by said flexible portion of the latch member and extending beyond the other end of said other link.

12. Overriding means according to claim 10, said coupling at said other end of said other link comprising a pivot pin, and said releasably engageable formations comprising an end of the pivot pin and a recess in the extending portion of said latch member in position to receive the pin end.

* * * * *